(12) United States Patent  (10) Patent No.: US 8,332,124 B2
George et al.  (45) Date of Patent: Dec. 11, 2012

(54) MASS BASED METHODS AND SYSTEMS FOR ESTIMATING SOOT LOAD

(75) Inventors: Sam George, Painted Post, NY (US); Suhao He, Painted Post, NY (US); Achim Karl-Erich Heibel, Corning, NY (US); Min Shen, Horseheads, NY (US)

(73) Assignee: Corning Incorporated, Corning, NY (US)

( * ) Notice: Subject to any disclaimer, the term of this patent is extended or adjusted under 35 U.S.C. 154(b) by 525 days.

(21) Appl. No.: 12/625,049

(22) Filed: Nov. 24, 2009

(65) Prior Publication Data

US 2011/0120088 A1  May 26, 2011

(51) Int. Cl.
*G06F 19/00* (2011.01)
*G06F 19/26* (2011.01)

(52) U.S. Cl. ........................................ 701/102; 701/114

(58) Field of Classification Search .................. 701/102, 701/114; 60/276, 274, 273, 295; 55/DIG. 30
See application file for complete search history.

(56) References Cited

U.S. PATENT DOCUMENTS

| | | | |
|---|---|---|---|
| 5,110,747 A | 5/1992 | Pataschnick et al. | |
| 6,397,587 B1 | 6/2002 | van Nieuwstadt et al. | |
| 6,408,686 B1 | 6/2002 | Tallio et al. | |
| 6,941,750 B2 | 9/2005 | Boretto et al. | |
| 6,947,831 B2 | 9/2005 | van Nieuwstadt | |
| 7,017,338 B2 | 3/2006 | van Nieuwstadt | |
| 7,031,827 B2 * | 4/2006 | Trudell et al. ................ | 701/114 |
| 7,065,960 B2 | 6/2006 | Gioannini et al. | |
| 7,243,489 B2 | 7/2007 | Johnson et al. | |
| 7,263,825 B1 | 9/2007 | Wills et al. | |
| 7,322,184 B2 | 1/2008 | Kondou et al. | |
| 7,562,524 B2 | 7/2009 | Wills et al. | |
| 2004/0204818 A1 * | 10/2004 | Trudell et al. ................ | 701/114 |
| 2007/0006577 A1 * | 1/2007 | Yokoyama et al. ............ | 60/297 |
| 2007/0061064 A1 * | 3/2007 | Dollmeyer et al. .......... | 701/114 |

(Continued)

FOREIGN PATENT DOCUMENTS

EP  1 081 347  3/2001

(Continued)

OTHER PUBLICATIONS

Tandon, P., et al., "Translational Brownian Diffusion Coefficient of Large (Multi-Particle) Suspended Aggregates," *I/EC Res.*, 34 (10), 3265-3277, 1995., May 1, 2002.

(Continued)

*Primary Examiner* — Mahmoud Gimie
(74) *Attorney, Agent, or Firm* — Matthew B. McNutt

(57) ABSTRACT

Mass based methods and systems for estimating soot load in a filter of an after-treatment system for exhaust stream are provided. The after-treatment system can comprise a sensor, a filter, and a processor configured to estimate soot load in the filter based on a mass based multi-layer model. An example system includes a virtual sensor comprising an estimator for providing information corresponding to a filter outlet $NO_2$ concentration. An example method includes the steps of providing the mass based multi-layer model, passing the exhaust stream through the filter, and using the sensor to monitor a condition of the exhaust stream. The example method further includes the steps of calculating a total regeneration rate based on the multi-layer model by solving a second-order ordinary differential equation with a plurality of parameters using an analytical approach, and estimating the soot load based on the calculated total regeneration rate.

21 Claims, 3 Drawing Sheets

U.S. PATENT DOCUMENTS

| | | |
|---|---|---|
| 2007/0068147 A1 | 3/2007 | Sun et al. |
| 2007/0130921 A1* | 6/2007 | Yezerets et al. ............. 60/295 |
| 2008/0078236 A1 | 4/2008 | Mital et al. |
| 2008/0149081 A1 | 6/2008 | Allain |
| 2009/0049815 A1 | 2/2009 | Beall et al. |
| 2009/0056312 A1 | 3/2009 | Wills et al. |

FOREIGN PATENT DOCUMENTS

| | | |
|---|---|---|
| JP | 2003-307110 | 10/2003 |
| WO | 2005-116413 | 12/2005 |
| WO | 2007-035577 A2 | 3/2007 |

OTHER PUBLICATIONS

S. England, et al., "Investigation of the Effect of DPF Loading and Passive Regeneration on Engine Performance and Emissions Using an Integrated System Simulation", SAE 2006-01-0263, Apr. 3, 2006.

A. York, et al., "Modeling of the Catalyzed Continuously Regenerating Diesel Particulate Filter (CCR-DPF) System: Model Development and Passive Regeneration Studies", SAE 2007-01-0043, Jan. 23, 2007.

G. Koltsakis, et al., "Optimization Methodologies of DPF Substrate-catalyst Combinations", SAE 2009-01-029, Jan. 2, 2009.

* cited by examiner

MASS BASED METHODS AND SYSTEMS FOR ESTIMATING SOOT LOAD

BACKGROUND OF THE INVENTION

1. Field of the Invention

The present invention relates generally to methods and systems for estimating soot load, and more particularly, to mass based methods and systems for estimating soot load in a filter of an after-treatment system for exhaust stream.

2. Technical Background

It is known to measure or estimate soot load in a particulate filter of an after-treatment system for exhaust stream to determine the regeneration and ash removal schedules of the filter. Known methods for estimating soot load have limitations under various dynamic conditions, such as low flow conditions and/or deep-bed penetration. In addition, known methods for estimating soot load may not be suitable for real-time application and/or for the whole engine operation range and through the filter lifetime.

SUMMARY OF THE INVENTION

The following presents a simplified summary of the invention in order to provide a basic understanding of some example aspects of the invention. This summary is not an extensive overview of the invention. Moreover, this summary is not intended to identify critical elements of the invention nor delineate the scope of the invention. The sole purpose of the summary is to present some concepts of the invention in simplified form as a prelude to the more detailed description that is presented later.

In one example aspect, a method is provided for estimating soot load in a filter of an after-treatment system for exhaust stream. The method includes the step of providing a mass based multi-layer model including a soot layer, an ash layer, a wall layer, a second-order ordinary differential equation, and a plurality of parameters. The method further includes the steps of passing the exhaust stream through the filter, and using a sensor to monitor a condition of the exhaust stream, which are included in the plurality of parameters of the multi-layer model. The method still further includes the steps of calculating a total regeneration rate based on the multi-layer model by solving the second-order ordinary differential equation with the plurality of parameters using an analytical approach, and estimating the soot load based on the calculated total regeneration rate.

In another example aspect, an after-treatment system is provided for exhaust stream. The after-treatment system includes a sensor configured to monitor a condition of the exhaust stream, a filter, and a processor configured to estimate soot load in the filter based on a mass based multi-layer model including a soot layer, an ash layer, a wall layer, a second-order ordinary differential equation, and a plurality of parameters. The processor is programmed to provide the multi-layer model and monitor a condition of the exhaust stream through the sensor. The monitored condition is included in the plurality of parameters of the multi-layer model. The processor is further programmed to calculate a total regeneration rate based on the multi-layer model by solving the second-order ordinary differential equation with the plurality of parameters using an analytical approach; and estimate the soot load based on the total regeneration rate.

In still another example aspect, a virtual sensor for an after-treatment system including a filter for exhaust stream is provided. The virtual sensor is configured to provide information corresponding to a filter outlet $NO_2$ concentration. The virtual sensor comprises an estimator having an input. The estimator is configured to provide a mass based multi-layer model including a soot layer, an ash layer, a wall layer, a second-order ordinary differential equation, and a plurality of parameters; and monitor a condition of the exhaust stream through the input. The monitored condition is included in the plurality of parameters of the multi-layer model. The estimator is also configured to solve profiles of $NO_2$ within all layers of the multi-layer model based on the multi-layer model by solving the second-order ordinary differential equation with the plurality of parameters using an analytical approach.

BRIEF DESCRIPTION OF THE DRAWINGS

These and other features, aspects and advantages of the present invention are better understood when the following detailed description of the invention is read with reference to the accompanying drawings, in which.

DETAILED DESCRIPTION OF THE INVENTION

Figure 1:
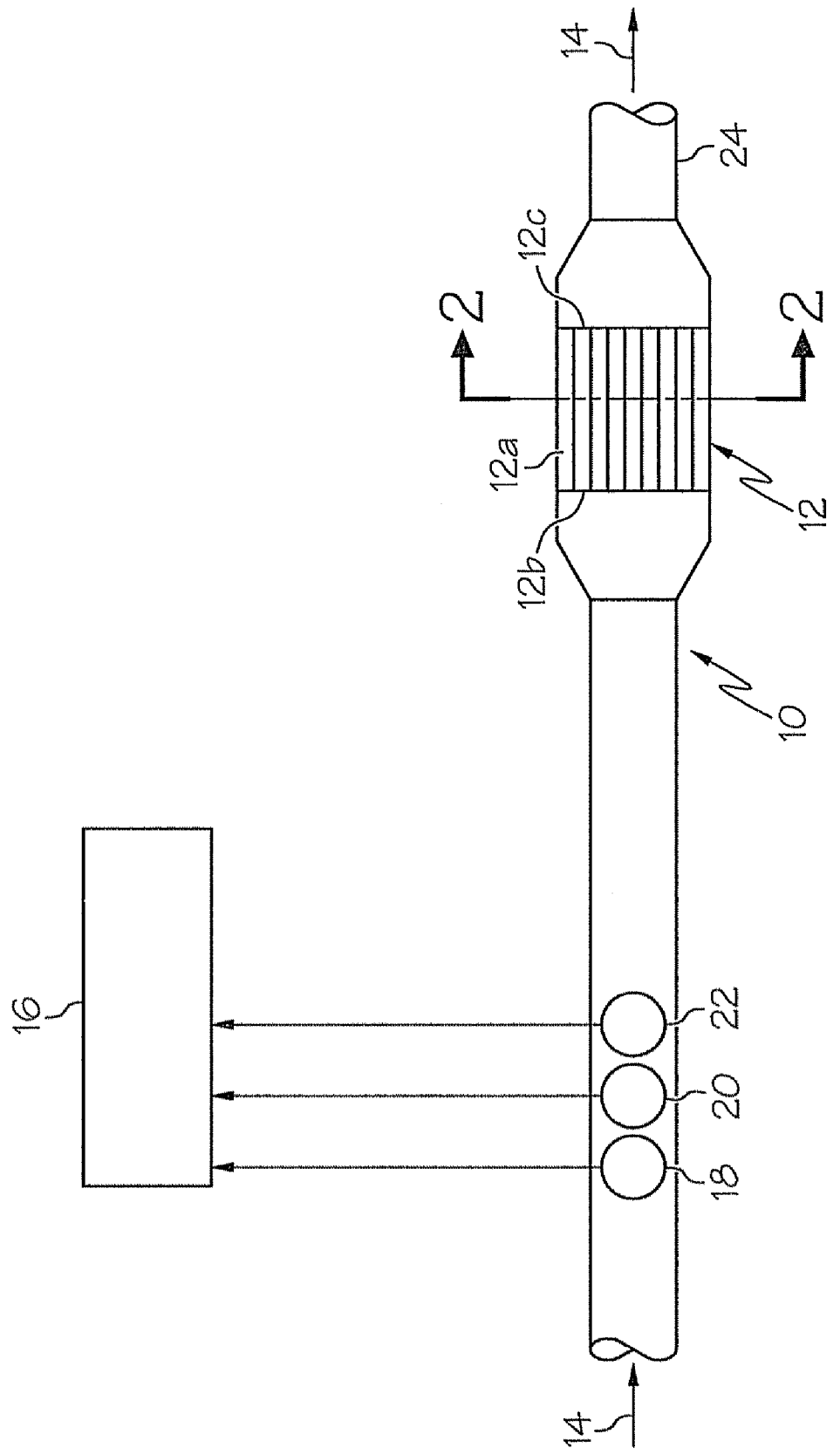
FIG. 1 is a schematic diagram of a portion of an after-treatment system for exhaust stream and an estimator for the after-treatment system.

In the following detailed description, for purposes of explanation and not limitation, example embodiments disclosing specific details are set forth to provide a thorough understanding of the present invention. However, it will be apparent to one having ordinary skill in the art, having had the benefit of the present disclosure, that the present invention may be practiced in other embodiments that depart from the specific details disclosed herein. Moreover, descriptions of well-known devices, methods, and materials may be omitted so as not to obscure the description of the present invention. Finally, wherever applicable, like reference numerals refer to like elements.

An example system for estimating soot load in a filter of an after-treatment system for exhaust stream is shown in FIG. 1. The after-treatment system 10 can include a filter, such as a diesel particulate filter (DPF) 12 for filtering out soot particles from a flow of exhaust stream 14, an estimator 16 for estimating soot load in the DPF 12, and various sensors 18, 20, and 22 at a location upstream of the DPF 12 to monitor one or more conditions of the exhaust stream 14.

In example embodiments, the after-treatment system 10 carries the exhaust stream 14 from an internal combustion engine (not shown), such as a diesel engine. It is to be appreciated that the engine does not need to be a diesel engine, and could be another type of internal combustion engine, such as a gasoline engine, for example. Nevertheless, the following description refers to a diesel system and controls for a diesel system for ease of explaining example embodiments, but it is understood that other (i.e., non-diesel) systems may be similarly controlled.

As shown in FIG. 1, in the after-treatment system 10, one or more sensors 18, 20, and 22 located upstream of the DPF 12 can be used to provide the condition of the exhaust stream 14 to the estimator 16. A temperature sensor 18 can obtain the temperature T of the exhaust stream 14 before entering the DPF 12. The estimator 16 can be configured to monitor the temperature T of the exhaust stream 14 via an output from the temperature sensor 18. A gas sensor 20 can provide the oxygen concentration $C_{O2}$, NOx concentration $C_{NOx}$, and $NO/NO_2$ split of the exhaust stream 14 to the estimator 16. A mass flow sensor rate 22 can provide the mass flow rate $\dot{m}_{exh}$ of the exhaust stream 14 to the estimator 16. It is to be appreciated that one or more of the conditions monitored by the estimator 16 via the sensors 18, 20, and 22 can be calculated or estimated by the estimator 16, and that the sensors could be mounted at various alternative locations along the after-treatment system 10. It is also to be appreciated that the sensors 18, 20, and 22 can be any instrumentation/sensors available in the after-treatment system 10, or can be any "virtual sensors" which provide the condition of the exhaust stream 14 through calculations or estimations.

The after-treatment system 10 can include filters that filter out particulates from the exhaust stream 14 before the exhaust stream 14 is discharged through a tailpipe 24 into the atmosphere. Various types of filters, such as partial filters or full filters, can be used in accordance with the present invention. In one example, the filter can include DPF 12, such as porous ceramic honeycomb filters. It is useful to periodically clean out, i.e., "regenerate", the DPF 12 by removing accumulated soot that has been filtered by the DPF 12. It is also helpful to remove the ash accumulated in the DPF 12 formed by the regeneration process of the accumulated soot. In the after-treatment system 10, the DPF 12 can be regenerated either passively or actively. In passive regeneration, the soot is burned by $NO_2$-based oxidation. $NO_2$/NOx ratio can be boosted through an upstream diesel oxidation catalyst (DOC). $NO_2$ can also be regenerated through NO oxidation inside the DPF 12 by catalyst. To achieve the active regeneration, the DPF 12 can be regenerated by burning the accumulated soot by raising the temperature of the exhaust stream 14 to the level required to oxidize soot by oxygen. Accordingly, the DPF 12 can comprise either bare filters or coated filter with catalyst coating. Moreover, the after-treatment system 10 may further include a DOC (not shown) and, if NOx removal is desired, a selective catalytic reaction (SCR, not shown) component.

Figure 2:
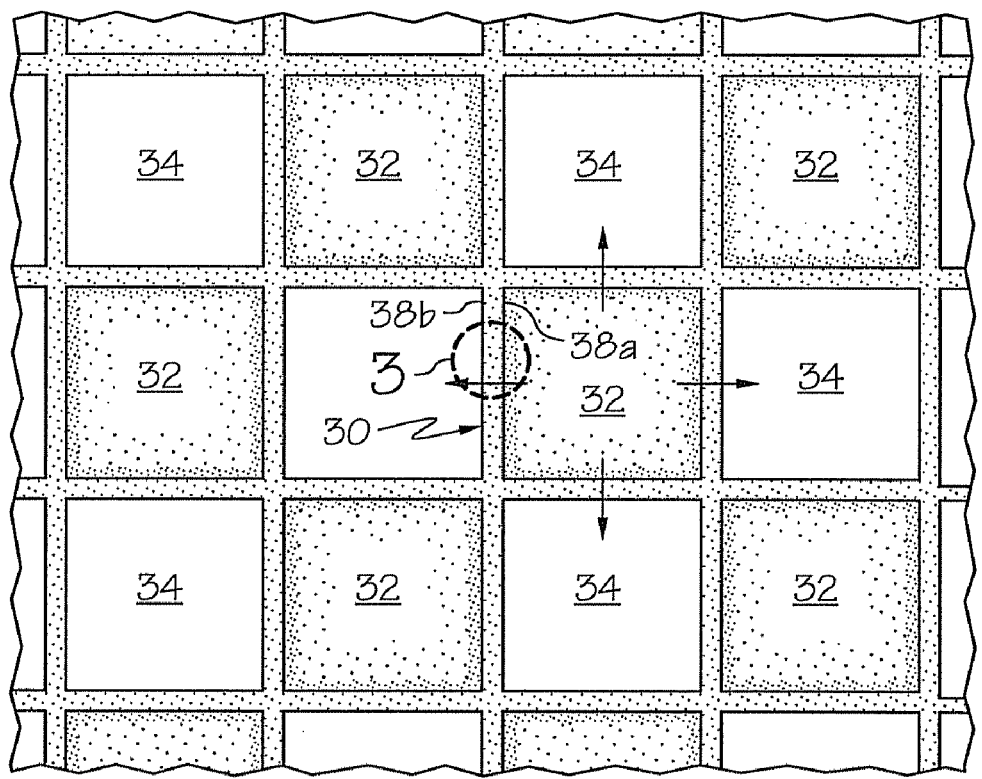
FIG. 2 is an enlarged partial cross sectional view of the filter illustrated in FIG. 1 along the section lines 2-2.
Figure 3:
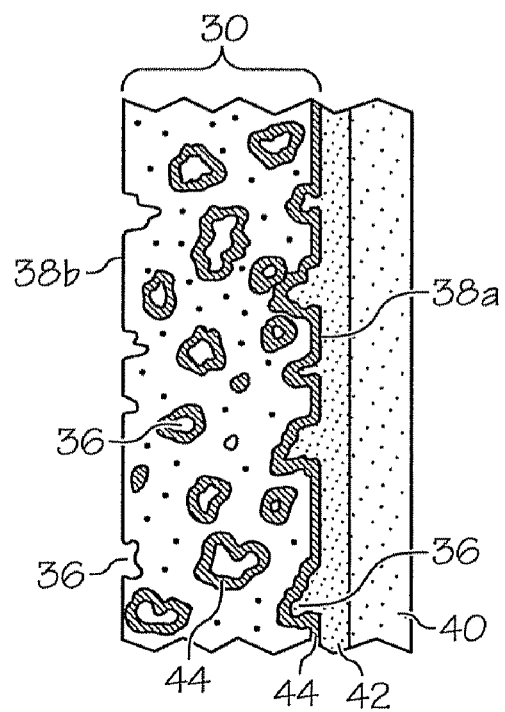
FIG. 3 is an enlarged view of a portion of the wall circled in phantom in FIG. 2.

A detailed example of the DPF 12 in the after-treatment system is shown in FIGS. 2 and 3. The DPF 12 can have a ceramic body 12a containing a plurality of interconnected porous ceramic walls 30 (i.e. wall layer), an inlet 12b having a plurality of inlet channels 32, and an outlet 12c with a plurality of outlet channels 34. While the channels illustrated in FIG. 2 are shown as squares in cross-section, other shapes, such as octagons, hexagons, rectangles, circles, triangles, and combinations thereof may be used as well. The inlet channels 32 and outlet channels 34 between are separated by the porous ceramic walls 30 of the ceramic body 12a. In addition, at least some of the inlet channels 32 and outlet channels 34 are plugged at the end of the channel. For example, ends of the outlet 12c of the inlet channels 32 are plugged while ends of the inlet 12b of the outlet channels 34 are plugged. Such arrangement prevents the exhaust stream 14 from passing straight through the ceramic body 12a. Instead, as indicated by the flow arrows in FIG. 2, the exhaust stream 14 is forced to go through the porous ceramic walls 30 from the inlet channels 32 and into adjacent outlet channels 34, where it is expelled out of the outlet 12c of the DPF 12. The porous ceramic walls 30 include interconnect microstructures with pores 36, which allow the exhaust stream 14 to freely flow through the walls 30 forming the inlet and outlet channels 32, 34, so that entrained soot may be filtered out.

Referring to FIGS. 2 and 3, in operation, the DPF 12 is coupled such that the inlet 12b of the DPF 12 receives pressurized exhaust stream 14. Exhaust stream 14 enters the ceramic body 12a of the DPF 12 through a plurality of inlet channels 32. Specifically, the exhaust stream 14 first enters pores 36 of the microstructure present on the inner surface 38a of the inlet channels 32, and then exits the pores 36 on the outer surface 38b. Entrained soot particles in the exhaust stream 14 form a soot layer 40 over the inner surface 38a, as shown in FIG. 3. For long-term operation, ash from the exhaust stream 14 accumulates and forms an ash layer 42 between the wall layer 30 and the soot layer 40, preventing soot penetrating into the wall layer 30. Optionally, the DPF 12 can be coated with a catalyst coating 44 to facilitate the regeneration process of the DPF 12. For example, platinum group metals (PGM), such as platinum or palladium, can be coated on the inner surface 38a of the inlet channels 32 and/or on the surfaces of the pores 36 inside the ceramic walls 30 as the catalyst coating 44. Multiple wall layers having different catalyst coatings work as well. Therefore, a multi-layer structure including at least one wall layer 30 with or without a catalyst coating 44, an ash layer 42, and a soot layer 40 can be formed in the DPF 12 as shown in FIG. 3.

Figure 4:
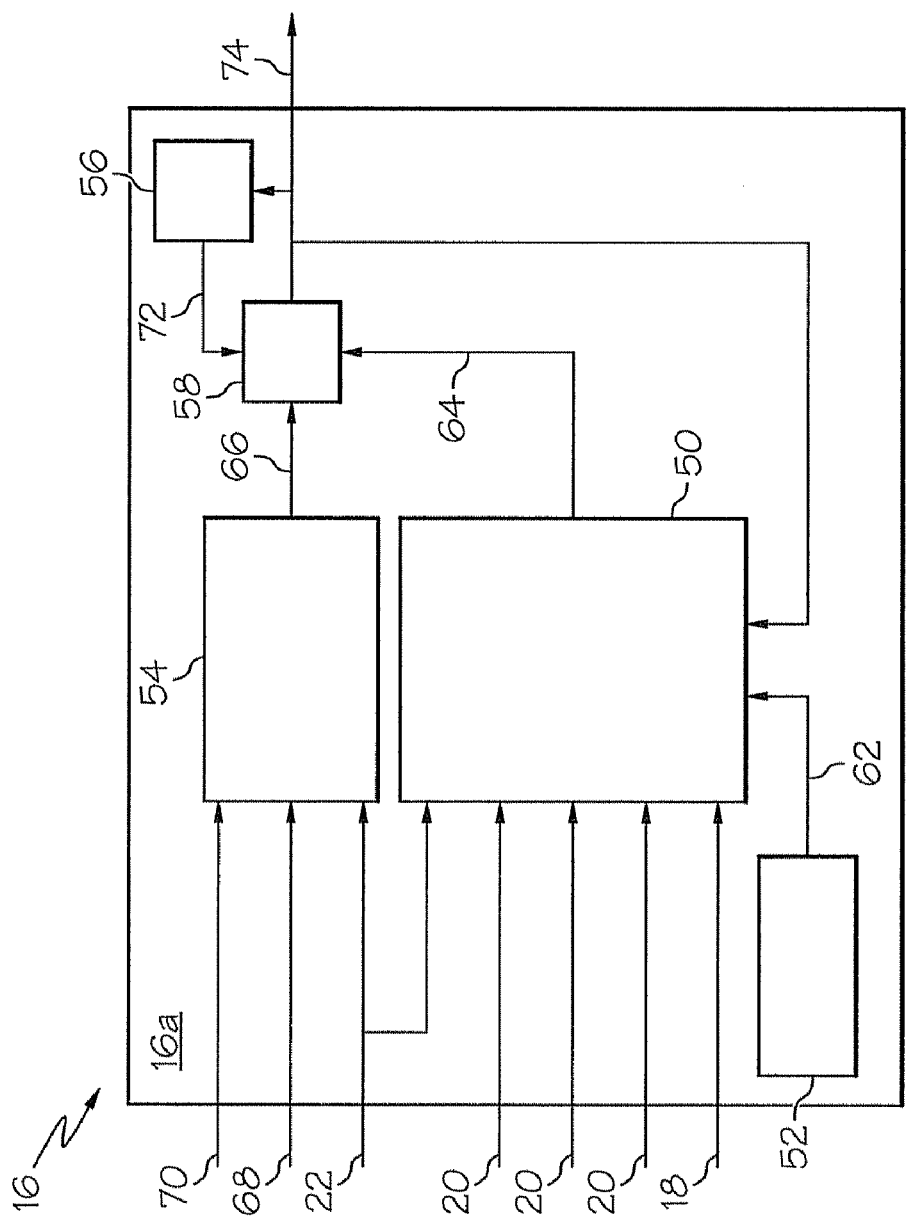
FIG. 4 is a schematic diagram of a processor of the estimator for the after-treatment system in FIG. 1.

Turning to FIG. 4, an example embodiment of the estimator 16 for estimating soot load in the DPF 12 based on a mass based multi-layer model is shown in detail. The estimator 16 can include a processor 16a. The estimator 16 can include one or more of a microprocessor, a microcontroller, a digital signal processor (DSP), an application specific integrated circuit (ASIC), a field-programmable gate array (FPGA), discrete logic circuitry, or the like. The estimator 16 can further include memory and can store program instructions that cause the estimator 16 to provide the functionality ascribed to it herein. The memory can include one or more volatile, non-volatile, magnetic, optical, or electrical media, such as read-only memory (ROM), random access memory (RAM), electrically-erasable programmable ROM (EEPROM), flash memory, or the like. The estimator 16 can further include one or more analog-to-digital (A/D) converters for processing various analog inputs to the controller. The estimator 16 can also be integrated into an engine control unit (ECU).

Referring to FIG. 4, the estimator 16 can include a regeneration rate estimator 50, an ash estimator 52, an engine out (EO) emission rate estimator 54, a delay unit 56, and an adder 58. The regeneration rate estimator 50 calculates the soot load change by regeneration, i.e., total regeneration rate $dSL_{reg}/dt$. The regeneration rate estimator 50 can further calculate the soot load regeneration $dSL_{reg}$ 64 in each estimation step having a time interval $\Delta t$ and output $dSL_{reg}$ 64 to the adder 58. The regeneration rate estimator 50 can operatively connect to the temperature sensor 18, gas sensor 20, mass flow rate sensor 22, ash estimator 52, and adder 58 to obtain the information, such as the temperature T, oxygen concentration $C_{O2}$, $NO_2$ concentration $C_{NO2}$, NO concentration $C_{NO}$, mass flow rate $\dot{m}_{exh}$ of the exhaust stream 14, and ash load $AL_i$ 62, as inputs. The ash estimator 52 calculates the ash load $AL_i$ 62 of the ash layer 42 and outputs it to the regeneration rate estimator 50. The EO emission rate estimator 54 calculates the soot load change induced by engine emission; i.e. soot load accumulation $dSL_{acc}$ 66 based on inputs including mass flow rate $\dot{m}_{exh}$ 22, particulate matter concentration 68, and element carbon/organic carbon ratio (EC/OC) 70 of the exhaust stream 14. The soot load accumulation $dSL_{acc}$ 66 provided by the EO emission rate estimator 54 is outputted to the adder 58 as well. In a given time interval $\Delta t$ of each estimation step, the adder 58 calculates the total amount of soot load change according to the inputted soot load regeneration $dSL_{reg}$ 64 and soot load accumulation $dSL_{acc}$ 66. Besides $dSL_{reg}$ 64 and $dSL_{acc}$ 66, the result of the soot load $SL_{i-1}$ 72 at the previous estimation step is also inputted to the adder 58 from the delay unit 56 and used to calculate the soot load $SL_i$ 74 at the current estimation step. The delay unit 56 may have memories to store the results of the soot load in each estimation step and output it during the following estimation steps after a certain delay time. In most cases, the delay time is set as the same as the time interval $\Delta t$ between each estimation step. The result of the adder 58 is provided as the output 74 of estimator 16 indicating the estimated soot load $SL_i$ of the current estimation step. As mentioned before, the result is also provided to the delay unit 56 and the regeneration rate estimator 50 for estimating the soot load $SL_{i+1}$ of the next estimation step.

Example methods for estimating soot load in a filter of an after-treatment system in accordance with aspects of the present invention will now be described.

In example embodiments, methods can comprise the step of providing a mass based multi-layer model in the regeneration rate estimator 50. The multi-layer model may comprise the soot layer 40, the ash layer 42, and the wall layer 30 with or without the catalyst coating 44. The multi-layer model can capture most of the fundamental processes in the regeneration, including advection/diffusion, passive and active reaction, thermodynamics, soot/ash/wall parameters, and catalyst PGM loading. The method employing the multi-layer model is different from the conventional lookup table or statistical method, which requires cumbersome calibration procedures and is very case specific and limited in accuracy. Furthermore, the multi-layer model can be solved analytically so that no time-consuming numerical techniques such as iterations are required for estimating the regeneration rate.

In the soot layer 40, soot is regenerated by both oxidation, i.e., active regeneration by oxygen, and $NO_2$-based oxidation, i.e. passive regeneration. Gas components in the exhaust stream 14 are transported by both advection and diffusion. A generic governing second-order ordinary differential equation for mass balance can be set up as $$\frac{d^2 y}{d\eta^2} - Pe \frac{dy}{d\eta} - R(y - y_0) = 0 \quad (1)$$

wherein $$Pe = \frac{u\delta}{D} \quad (2)$$

where y is an oxidant mole fraction based on monitored oxidant concentrations (e.g. $C_{O2}$, $C_{NO2}$), $y_0$ is a derivation parameter, $\eta$ is a non-dimensional length, u is a gas velocity across a layer, $\delta$ is a layer thickness, D is an oxidant diffusivity in a layer, and R is a reaction term.

In equation (1), the reaction term R can be derived from detailed reaction kinetics. The following Table 1 shows the reaction term R used in each layer of the multi-layer model. It is to be appreciated that R can take different forms if a different set of reaction kinetics are adopted or different reactions are involved.

TABLE 1

| | Reactions | R | $y_0$ |
|---|---|---|---|
| Soot layer ($O_2$) | $C + \left(1 - \frac{\alpha}{2}\right)O_2 \rightarrow \alpha CO + (1 - \alpha)CO_2$ | $\frac{\rho_s \delta_s^2}{c_e D_s}\left(1 - \frac{\alpha}{2}\right)(k_{0,s} a_s) e^{\frac{E_f}{RT}}$ | 0 |
| Soot layer ($NO_2$) | $C + (2 - \alpha_1)NO_2 \rightarrow$ $\alpha_1 CO + (1 - \alpha_1)CO_2 + (2 - \alpha_1)NO$ $C + (1 - \alpha_h)NO_2 + \frac{1}{2}O_2 \rightarrow$ $\alpha_h CO + (1 - \alpha_h)CO_2 + (1 - \alpha_h)NO$ | $\left[\frac{\rho_s \delta_s^2}{c_e D_s}(1 - \alpha_h)(k_{0,h} a_s) e^{\frac{E_h}{RT}} y_{O_2}^b + \frac{\rho_s \delta_s^2}{c_e D_s}(2 - \alpha_1)(k_{0,l} a_s) e^{\frac{E_l}{RT}}\right]$ | 0 |
| Wall layer w/ catalyst ($NO_2$) | $NO + \frac{1}{2}O_2 \leftrightarrow NO_2$ | $\frac{\rho_c \delta_c^2}{c_e D_c}(k_{0,c} a_c) e^{\frac{E_c}{RT}} y_{O_2}^{0.5} \cdot \left(1 + \frac{1}{y_{O_2}^{0.5} k_{0,e} e^{\frac{E_c}{RT}}}\right)$ | $\frac{1}{1 + \frac{1}{y_{O_2}^{0.5} k_{0,e} e^{\frac{E_c}{RT}}}} y_{NOx}$ |
| Wall layer w/o catalyst ($O_2/NO_2$) | None | 0 | 0 |
| Ash layer ($O_2/NO_2$) | None | 0 | 0 |

In these R terms, $c_e$ is a gas molar concentration; $\rho$ is a layer density; $\alpha$, b, c, $k_0$, R, and E are all kinetics parameters; a is the specific area of reaction sites. The subscripts, s and c, represent corresponding parameters in soot layer 40 and wall layer 30 with catalyst coating 44, respectively. The subscripts, l and h, represent two types of $NO_2$-based oxidation reactions in soot layer 40. The multi-layer model describes the fundamental processes in the DPF 12, including advection/diffusion, oxidation/$NO_2$-based oxidation, thermodynamics, soot/ash/wall microstructure/geometry, and catalyst PGM loading.

The boundary conditions on the interface between different layers are the continuity of oxidant concentrations and mass fluxes. For inlet channels 32, the boundary condition of the top surface of soot layer 40 is set as a given oxidant flux going into the soot layer 40; while on the outer surface 38b of the outlet channels 34, the boundary condition is set as zero gradient of oxidant concentrations.

In example embodiments, methods further include a step of passing the exhaust stream 14 through the DPF 12, and using one or more sensors 18, 20, 22 to monitor a condition of the exhaust stream 14 at a location upstream of the DPF 12. The conditions of the exhaust stream 14 include but are not limited to the temperature T, oxygen concentration $C_{O2}$, $NO_2$ concentration $C_{NO2}$, NO concentration $C_{NO}$, and mass flow rate $\dot{m}_{exh}$. The conditions are sent to the estimator 16 as a part of the parameters of the multi-layer model for calculating the regeneration rate. The conditions can be measured using the instrumentation/sensors available in the after-treatment system 10, or estimated by "virtual sensors". For example, $NO_2$ concentration $C_{NO2}$ may be calculated based on the DOC NO/NO2 conversion.

In example embodiments, after monitoring the condition of the exhaust stream 14, the estimator 16 can calculate a total regeneration rate $dSL_{reg}/dt$ based on the multi-layer model by solving the second-order ordinary differential equation (1) with the plurality of parameters using an analytical approach.

Equation (1) can be solved analytically. For each layer in the multi-layer model and each oxidant (e.g. $O_2$ and $NO_2$), one has the following profile $$y = y_0 + C_1 \exp(r_1 \eta) + C_2 \exp(r_2 \eta) \quad (3)$$

wherein r is derived from $$r_{1,2} = \frac{Pe \pm \sqrt{Pe^2 + 4R}}{2} \quad (4)$$

As stated above, the total regeneration rate $dSL_{reg}/dt$ includes an active regeneration rate $(dSL_{reg}/dt)_{O2}$ of soot oxidation by oxygen, and a passive regeneration rate $(dSL_{reg}/dt)_{NO2}$ of soot $NO_2$-based oxidation. The total regeneration rate $dSL_{reg}/dt$ is the sum of the active regeneration rate $(dSL_{reg}/dt)_{O2}$ and passive regeneration rate $(dSL_{reg}/dt)_{NO2}$, shown as $$\frac{dSL_{reg}}{dt} = \left(\frac{dSL_{reg}}{dt}\right)_{O_2} + \left(\frac{dSL_{reg}}{dt}\right)_{NO_2} \quad (5)$$

The following steps explain how to solve the passive regeneration rate $(dSL_{reg}/dt)_{NO2}$ and the $NO_2$ profile. By plugging in the boundary conditions into equation (3), a matrix can be set up for $NO_2$ profile $$\begin{pmatrix} r_{2s} & r_{1s} & & & & \\ e^{r_{1s}} & e^{r_{2s}} & -1 & -1 & & \\ G_s r_{2s} e^{r_{1s}} & G_s r_{1s} e^{r_{2s}} & -G_a r_{2a} & -G_a r_{1a} & & \\ & & e^{r_{1a}} & e^{r_{2a}} & -1 & -1 \\ & & G_a r_{2a} e^{r_{1a}} & G_a r_{1a} e^{r_{2a}} & -G_c r_{2c} & -G_c r_{1c} \\ & & & & r_{1c} e^{r_{1c}} & r_{2c} e^{r_{2c}} \end{pmatrix} \quad (5)$$

$$\begin{pmatrix} C_{1s} \\ C_{2s} \\ C_{1a} \\ C_{2a} \\ C_{1c} \\ C_{2c} \end{pmatrix} = \begin{pmatrix} Pe_s y_{in} \\ 0 \\ 0 \\ y_{0,c} \\ G_c Pe_c y_{0,c} \\ 0 \end{pmatrix}$$

wherein G is a parameter characterizing the impact of layer microstructure/pores 36 on transport $$G = \frac{D}{\delta} \quad (6)$$

where the subscripts, s, a, and c, represent corresponding parameters in soot layer 40, ash layer 42, and wall layer 30 with or without catalyst coating 44, respectively.

By solving the matrix (5), the C parameters in equation (3) can be derived. Thus, the $NO_2$ profiles within all the layers are available from equation (3). The passive regeneration rate $(dSL_{reg}/dt)_{NO2}$ can be calculated as $$\left(\frac{dSL_{reg}}{dt}\right)_{NO_2} = \frac{\left[(k_{0,h} a_s) e^{\frac{E_h}{RT_{bed}}} y_{O_2}^b\right] + \left[(k_{0,l} a_s) e^{\frac{E_l}{RT_{bed}}}\right]}{\left[(k_{0,h} a_s) e^{\frac{E_h}{RT_{bed}}} y_{O_2}^b\right](1 - \alpha_h) + \left[(k_{0,l} a_s) e^{\frac{E_l}{RT_{bed}}}\right](2 - \alpha_l)} \cdot \quad (7)$$

$$M_s \frac{A c_e D_s}{\delta_s} [Pe_s y_{in} - (C_{1s} r_{2s} e^{r_{1s}} + C_{2s} r_{1s} e^{r_{2s}})]$$

where $M_S$ is a molecular weight of the soot layer 40 and A is the total surface area of the soot layer 40.

It is noted that all the parameters in equation (7), except the parameters (e.g. $y_{in}$, $y_{O2}$, $T_{bed}$) derived from the monitored conditions of the exhaust stream 14, are decided based on $NO_2$ properties, and are either pre-stored in the estimator 16 or inputted before the calculation. $y_{in}$ and $y_{O2}$ are oxidant mole fractions based on $NO_2$ and oxygen concentrations of the exhaust stream 14, respectively, by the gas sensor 20. $T_{bed}$ is the DPF 12 bed temperature and is estimated using the following equation and used for the next estimation step, with input from the current estimation step $$T_{bed,i} = \frac{\dot{m}_{exh,i} c_{p,exh,i} \Delta t T + M_{dpf} c_{p,dpf,i-1} T_{bed,i-1} + \sum_j \left(\frac{dSL_{reg}}{dt}\right)_{j,i-1} \Delta H_j \Delta t}{\dot{m}_{exh,i} c_{p,exh,i} \Delta t + M_{dpf} c_{p,dpf,i}} \quad (8)$$

where T is the temperature of the exhaust stream 14 measured by the temperature sensor 18, $M_{dpf}$ is the filter mass, $c_p$ is specific heat, $\Delta t$ is the time interval of each estimation step, and $$\sum_j \left(\frac{dSL_{reg}}{dt}\right)_{j,i-1} \Delta H_j$$

represents the total heat release rate by the chemical reactions involved.

For long-term operations, ash gets accumulated, forming an ash layer 42, which has been included in the multi-layer model. The deactivation of catalyst can be caused by ash coverage on reaction sites, or other thermal, mechanical, or chemical reasons, which is described by the change of kinetics parameters, $a_c$ and $k_{0,c}$, for example, as a function of time and ash load $AL_i$ 62. Optionally, the ash load $AL_i$ 62 may be calculated by the ash estimator 52 and provided to the regeneration rate estimator 50 to update one or more kinetics parameters in the above equations.

In one example embodiment, the downstream $NO_2$ profile can also be derived using the following equation and matrix (5), which serves as a virtual sensor for $NO_2$ concentration at the DPF 12 outlet 12c $$y_{NO_2,out} = y_{0,c} + C_{1c}\exp(r_{1c}) + C_{2c}\exp(r_{2c}) \tag{9}$$

The virtual sensor can comprise the estimator 16 with inputs from the sensors 18, 20, 22. The estimator 16 solves equation (9) to obtain the $NO_2$ profile and mole fraction $y_{NO2,out}$ of the $NO_2$ concentration at the DPF 12 outlet 12c.

In example embodiments, similar governing equations and boundary conditions for oxygen mass balance can be set up by using oxygen properties. The active regeneration rate $(dSL_{reg}/dt)_{O2}$ and oxygen profile can be obtained in a similar way as $NO_2$ by solving equation (3) with matrix (5)

$$\left(\frac{dSL_{reg}}{dt}\right)_{O_2} = \frac{M_s}{1-0.5\alpha} \frac{\dot{m}_{exh}}{M_{exh}} y_{in}\left[1 - Pe_s \frac{e^{r_{1s}}e^{r_{2s}}(r_{2s} - r_{1s})}{r_{2s}r_{2s}e^{r_{2s}} - r_{1s}r_{1s}e^{r_{1s}}}\right] \tag{10}$$

wherein $M_{exh}$ is the molecular weight of the exhaust stream 14.

Similarly, all the parameters in equation (10), except the parameters (e.g. $y_{in}$, $\dot{m}_{exh}$) from the monitored conditions using the sensors 18, 20, 22, are decided based on oxygen properties. $y_{in}$ is an oxidant mole fraction based on oxygen concentrations of the exhaust stream 14 by the gas sensor 20. $\dot{m}_{exh}$ is the mass flow rate of the exhaust stream 14 measured by the mass flow rate sensor 22.

After obtaining the passive regeneration rate $(dSL_{reg}/dt)_{NO2}$ and active regeneration rate $(dSL_{reg}/dt)_{O2}$, the total regeneration rate $dSL_{reg}/dt$ is then calculated according to the matrix (5) by the estimator 16. The soot load regeneration $dSL_{reg}$ in each estimation step can be further calculated by multiplying the total regeneration rate $dSL_{reg}/dt$ with the time interval $\Delta t$ in each estimation step.

In example embodiments, methods can further comprise a step of estimating the soot load 74 based on the calculated total regeneration rate $dSL_{reg}/dt$. According to soot mass conservation, the current soot load $SL_i$ can be expressed by $$SL_i = SL_{i-1} + dSL_{acc} + dSL_{reg} \tag{11}$$

where $SL_i$ and $SL_{i-1}$ are soot loads at the current and previous estimation step. $dSL_{acc}$ is the soot load accumulation induced by engine emission. $dSL_{reg}$ is calculated by the regeneration rate estimator 50 in the previous steps. As discussed before, any known method in the art for estimating the soot load accumulation can be applied and used to obtain the soot load accumulation $dSL_{acc}$ by the EO emission rate estimator 54.

The estimated soot load $SL_i$ 74 is used to monitor the condition of the filter in the after-treatment system 10. In certain applications, the estimated soot load $SL_i$ 74 may serve as an indicator or alarm to initiate the process of regeneration, ash removal, or replacement of the filter, or to modify the existing schedules. In other applications, the estimated soot load $SL_i$ 74 may be used to control the engine conditions during the operation.

It is to be appreciated that the methods and system in accordance with the present invention can maintain accurate soot load estimations over the whole range of engine operation conditions (even very dynamic situations) and through the lifetime of a filter (with ash accumulation and catalyst deactivation). Because of the above advantages, the methods and systems based on the mass based multi-layer model can either be a stand-alone application or be integrated with methods or systems for estimating the soot load based on the pressure drop across the filter.

It will be apparent to those skilled in the art that various modifications and variations can be made to the present invention without departing from the spirit and scope of the invention. Thus, it is intended that the present invention cover the modifications and variations of this invention provided they come within the scope of the appended claims and their equivalents.

What is claimed is:

1. A method of estimating soot load in a filter of an after-treatment system for exhaust stream, comprising the steps of:
   providing a mass based multi-layer model including a soot layer, an ash layer, a wall layer, a second-order ordinary differential equation, and a plurality of parameters;
   passing the exhaust stream through the filter;
   using a sensor to monitor a condition of the exhaust stream, wherein the plurality of parameters include the monitored condition;
   calculating a total regeneration rate based on the multi-layer model by solving the second-order ordinary differential equation with the plurality of parameters using an analytical approach, and
   estimating the soot load based on the calculated total regeneration rate.

2. The method of claim 1, wherein the multi-layer model includes the second-order ordinary differential equation:

$$\frac{d^2 y}{d\eta^2} - Pe\frac{dy}{d\eta} - R(y - y_0) = 0$$

wherein $$Pe = \frac{u\delta}{D}$$

where y is an oxidant mole fraction, $y_0$ is a derivation parameter, $\eta$ is a non-dimensional length, u is a gas velocity across a layer, $\delta$ is a layer thickness, D is an oxidant diffusivity in a layer, and R is a reaction term.

3. The method of claim 2, wherein the reaction term R is determined based on a chemical reaction in each layer of the multi-layer model.

4. The method of claim 1, wherein the total regeneration rate includes an active regeneration rate of soot oxidation.

5. The method of claim 4, wherein the step of calculating the total regeneration rate further comprises the steps of:
   solving profiles of $O_2$ within all layers of the multi-layer model; and
   calculating the active regeneration rate based on the solved $O_2$ profiles.

6. The method of claim 1, wherein the total regeneration rate includes a passive regeneration rate of soot $NO_2$-based oxidation.

7. The method of claim 6, wherein the step of calculating the total regeneration rate further comprises the steps of:
   solving profiles of $NO_2$ within all layers of the multi-layer model; and
   calculating the passive regeneration rate based on the solved $NO_2$ profiles.

8. The method of claim 1, wherein the step of calculating the total regeneration rate further comprises a step of calculating a bed temperature of the filter.

9. The method of claim 1, wherein the filter is coated with a catalyst coating, and wherein the wall layer of the multi-layer model includes a wall layer with catalyst coating.

10. The method of claim 9, wherein the wall layer of the multi-layer model includes a plurality of wall layers with different catalyst coatings.

11. The method of claim 1, wherein the step of calculating the total regeneration rate further comprises the steps of:
calculating an ash load; and
updating the plurality of parameters of the multi-layer model based on the calculated ash load.

12. The method of claim 1, wherein the step of estimating the soot load further comprises a step of calculating a soot load accumulation caused by engine emission.

13. The method of claim 1, wherein the monitored condition of the exhaust stream is selected from a group consisting of temperature, $O_2$ and NOx concentrations, $NO/NO_2$ split, and mass flow rate.

14. The method of claim 1, wherein the estimated soot load based on the total regeneration rate is the first estimated soot load, the method further comprising the steps of:
estimating a second soot load based on a pressure drop across the filter; and
combining the first estimated soot load with the second estimated soot load.

15. The method of claim 1, further comprising a step of initiating a regeneration process of the filter based on the estimated soot load.

16. An after-treatment system for exhaust stream, comprising:
a sensor configured to monitor a condition of the exhaust stream;
a filter; and
a processor configured to estimate soot load in the filter based on a mass based multi-layer model including a soot layer, an ash layer, a wall layer, a second-order ordinary differential equation, and a plurality of parameters;
wherein the processor is programmed to:
provide the multi-layer model;
monitor a condition of the exhaust stream through the sensor, wherein the plurality of parameters include the monitored condition;
calculate a total regeneration rate based on the multi-layer model by solving the second-order ordinary differential equation with the plurality of parameters using an analytical approach; and
estimate the soot load based on the total regeneration rate.

17. The after-treatment system of claim 16, wherein the multi-layer model includes the second-order ordinary differential equation:

$$\frac{d^2 y}{d\eta^2} - Pe\frac{dy}{d\eta} - R(y - y_0) = 0 \text{ wherein } Pe = \frac{u\delta}{D}$$

where y is an oxidant mole fraction, $y_0$ is a derivation parameter, $\eta$ is a non-dimensional length, u is a gas velocity across a layer, $\delta$ is a layer thickness, D is an oxidant diffusivity in a layer, and R is a reaction term.

18. The after-treatment system of claim 17, wherein the reaction term R is determined based on a chemical reaction in each layer of the multi-layer model.

19. The after-treatment system of claim 16, wherein the sensor comprises
a temperature sensor configured to measure temperature of the exhaust stream;
a gas sensor configured to measure $O_2$ and NOx concentration of the exhaust stream; and
a mass flow sensor configured to measure a mass flow rate of the exhaust stream.

20. A virtual sensor for an after-treatment system including a filter for exhaust stream, comprising
an estimator having an input, wherein the estimator is configured to:
provide a mass based multi-layer model including a soot layer, an ash layer, a wall layer, a second-order ordinary differential equation, and a plurality of parameters;
monitor a condition of the exhaust stream through the input, wherein the plurality of parameters include the monitored condition; and
solve profiles of $NO_2$ within all layers of the multi-layer model based on the multi-layer model by solving the second-order ordinary differential equation with the plurality of parameters using an analytical approach,
wherein the virtual sensor is configured to provide information corresponding to a filter outlet $NO_2$ concentration.

21. The method of claim 1, further comprising a step of regenerating the filter based on the estimated soot load.

* * * * *